United States Patent Office 3,534,128
Patented Oct. 13, 1970

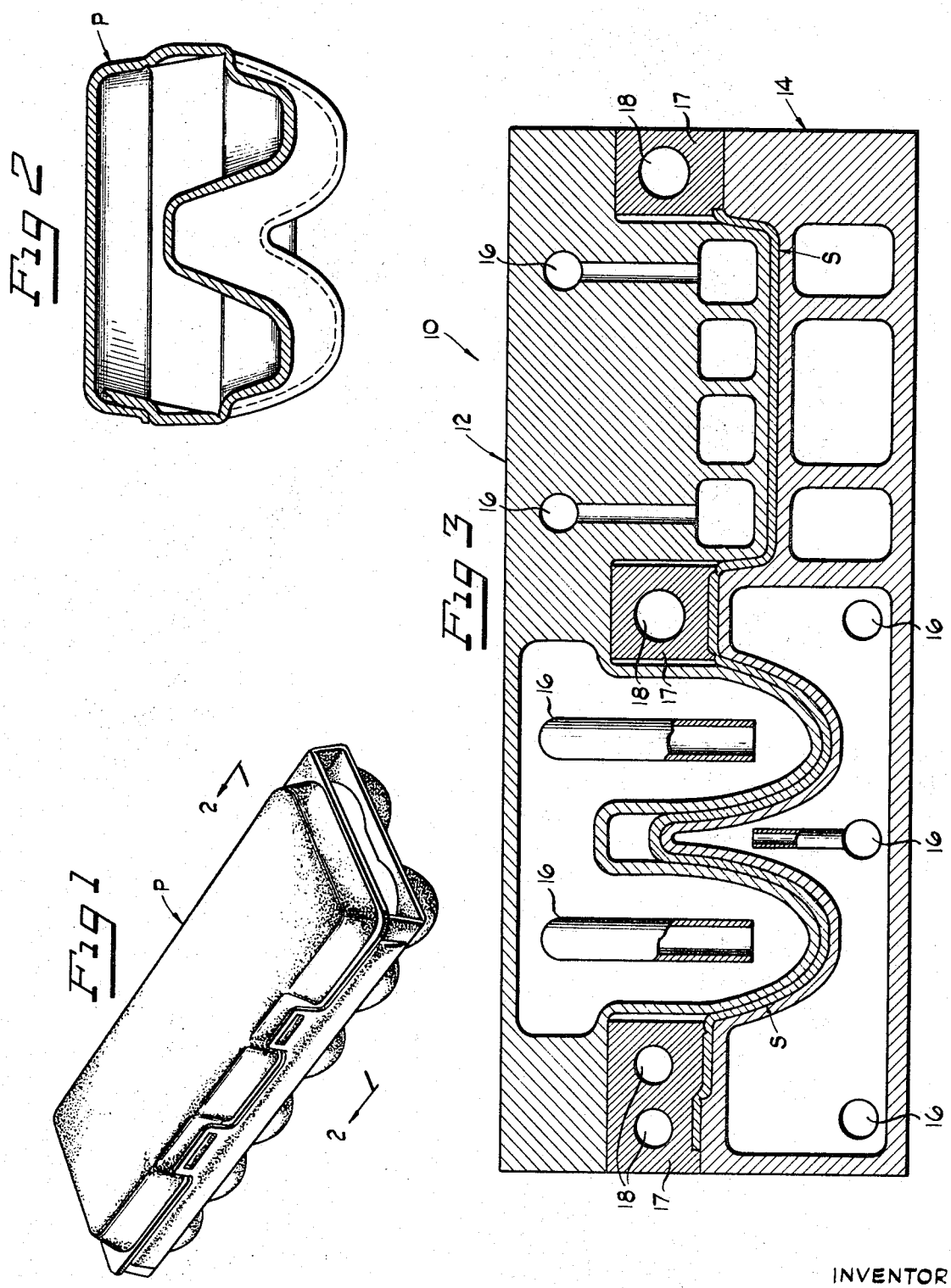

3,534,128
METHOD OF FORMING A FOAMED PLASTIC ARTICLE HAVING PORTIONS OF VARYING THICKNESS AND DENSITY
Alexander G. Makowski, 2413 Heather Road W., Wilmington, Del. 19803
Continuation-in-part of application Ser. No. 528,933, Feb. 21, 1966. This application Nov. 6, 1968, Ser. No. 805,914
Int. Cl. B29c 11/00; B29d 7/24, 27/00
U.S. Cl. 264—28
2 Claims

ABSTRACT OF THE DISCLOSURE

In a method of forming a molded article, having portions of varying thickness and density, from a sheet of thermoplastic material, the sheet is subjected to predetermined amount of heat for a period of time sufficient to expand the sheet so that the general cross-sectional dimension is greater than the maximum dimension required in the finished article. While the temperature of the sheet is within the desired range, the sheet is inserted between cooperating mold halves and the mold halves are closed. The sheet remains in the closed mold long enough for the formed article to cool thereby preventing further expansion of the article after its removal from the mold. Areas of the mold, where portions of article are formed requiring stretchability, may be supplied with heat. Other areas of the mold, where stiffened, warp-free portions of the article are formed, may be chilled.

---

This is a continuation-in-part of my application Ser. No. 528,933, filed Feb. 21, 1966 and now abandoned.

This invention relates to foamed plastic articles and methods of making them. More particularly the invention relates to a method of forming a finished molded article such as an egg carton, or the like, from a sheet of foamed plastic material such as polystyrene.

In the art of thermoforming of plastic articles the process consists of preheating of flat sheets and then forming them into various desired shaped by means of molds and vacuum or air pressure, or both, to force material into molds. In forming of material such as expandable polystyrene sheets, which consist of a series of closed cells, the conventional methods employed up until the present invention present serious deficiencies in the final product. The use of vacuum, and to a greater degree air pressure, tends to collapse the air cells which comprise the body of the molded article with the result that the article is weak and irregular in characteristics because of the lack of control over final wall thickness, uniformity, and density of the material.

It is an object of this invention to provide an improved method of forming a finished article from a sheet of expanded polystyrene material wherein a maximum degree of control is maintained over the thickness, uniformity, and density of the material in all portions of the finished product.

A further object of the invention is to provide in a method of molding expanded polystyrene, a means of positively controlling the density and thickness of the wall of the molded product so as to provide varying predetermined thicknesses and densities in various portions of the molded article.

A more specific object of the invention is a formation of an article from a sheet of expanded foamed plastic material, such as polystyrene, by the use of a pair of matched mold halves.

These and other objects of the invention will be apparent from an examination of the following description and drawings, wherein:

FIG. 1 is a perspective view of an egg carton which has been formed by a process embodying features of the invention;

FIG. 2 is a transverse, vertical section taken on line 2—2 of FIG. 1; and

FIG. 3 is a transverse, vertical cross-section of the article of FIGS. 1 and 2 shown in an opened position between a pair of cooperating halves of a mold.

It will be understood that, for purposes of clarity, certain elements have been omitted from certain views where they are illustrated to better advantage in other views.

Now turning to the drawing for a better understanding of the invention, and particularly to FIG. 1, it will be seen that there is shown a finished molded article. In this case, an egg carton, indicated generally at P, is shown to illustrate the invention, although it will be understood that the novel process included in the invention may be used to form various types of articles and products.

The use of an egg carton to illustrate the method of the invention is good because it affords an opportunity to illustrate the manner in which various portions or areas of the product which require different physical characteristics may be formed with various predetermined thicknesses and densities to give the desired characteristics. For instance, in the area of the carton which houses the eggs a cushioning effect is desired, so the wall thickness may be in the range of from .030″ to .090″ with a density of from 3.0 lbs./cu. ft. to 6.0 lbs./cu. ft. On the other hand, in the hinge area, where a great density is desired, the wall section may be formed with a thickness of from .005″ to .030″ and with a density of from 6.0 lbs./cu. ft. to 25.0 lbs./cu. ft.

Although various expanded or expandable foamed plastic materials may be used, for purposes of illustrating the invention, the material used in connection with the described process is foamed polystyrene in sheet form which has an original thickness of from .070″ to .090″ and an original density throughout its entire area of from 6.0 lbs./cu. ft. to 7.0 lbs./cu. ft.

The first step in the process is the preheating of the sheet of foamed material by placing it in an oven or in some other way, such as steam or hot air chamber, or to expose the sheet to radiant heat in order to subject the sheet to a temperature in the range of from approximately 180° to approximately 450° for a period of time in the range of from approximately 5 seconds to approximately 15 seconds in order to expand the sheet until the general cross-sectional dimension is greater than the maximum dimension required in the finished product. In the example at hand, the sheet of foamed plastic material is expanded until its general cross-sectional dimension is in the range of from approximately .150″ to .200″ and wherein the overall density throughout the entire area of the sheet is in the general range of from 2.5 lbs./cu. ft. to 3.5 lbs./cu. ft.

After the sheet of material has been preheated and is still within the previously described temperature range the sheet is inserted between a pair of cooperating male and female mold halves of matched mold. The opposed inner surfaces of the mold halves which define the mold cavity may be formed of a metal such as bronze or aluminum.

The mold halves are provided with areas or units which can be heated or controlled as desired to provide greater or lesser degrees of heating or cooling than the overall areas of the mold. In the formation of an article from a sheet of moldable plastic, a greater amount of heat must be supplied to the areas which are to undergo substantial stretching or depth drawing. As is known to those skilled in the art of molding plastic egg cartons, the area of plastic sheet from which egg receiving cells are formed, is subjected to considerable stretching. Therefore, additional heat must be supplied to those areas of the mold where the plastic, contained therein, is subjected to substantial stretching.

On the other hand, in the formation of an article such as an egg carton, it is desirable to prevent warping of such portions as the cover of the carton and to increase the stiffness thereof. To accomplish this, the area of the mold where the cover is being formed is subjected to chilling since chilling produces areas in the plastic which are stiffer than the unchilled areas and are warp-free.

Generally, therefore, additional heating of certain areas of the mold produces better stretching of the plastic located in those areas, while chilling of the appropriate mold areas prevents warping of the plastic contained therein and produces an area in the formed article which is stiffer than other areas.

Before the sheet is placed between the halves of the mold, the mold is preheated to a temperature in the range of from approximately 90° to approximately 140° although certain areas of the mold have been chilled to a temperature in the range of from approximately 30° to approximately 90°. Heating and chilling of the mold may be accomplished by the passage of steam, hot air, or hot water or cold water through passageways 16 and 18.

The mold may include separate sections 17 secured to other portions thereof for facilitating and improving heating or cooling of desired areas of the mold.

After the sheet has been placed within the preheated mold, the mold is closed and the sheet is allowed to remain in the mold a period of time of about 3 seconds, after which the mold is opened and the finished article is removed therefrom.

By heating and cooling various sections of the mold it is possible to retard or hasten the cooling of the sheet before, during, and after the forming operation. By permitting the material to remain in the mold at least 3 seconds there is sufficient time to cool the molded article and thereby prevent further expansion of the article after the mold has been opened.

In order to transport the sheet of plastic material through the oven (not shown) there may be provided a conventional conveyor system (not shown) which includes some type of clamp means for grasping and retaining edge portions of the sheet.

I claim:
1. In a method of forming a finished molded article having various portions with varying thicknesses and densities from a sheet of foamed polystyrene of approximately 80 mil thickness and 6½ lb./cu. ft. density, the steps of:
   (a) subjecting said sheet to a temperature in the range of from approximately 180° F. to approximately 450° F. for a period of time in the range of from approximately 5 seconds to approximately 15 seconds, in order to expand said sheet until the general cross-sectional dimension is greater than the maximum dimension required in the finished product;
   (b) while the temperature of said sheet is still within said temperature range, inserting said sheet between cooperating male and female mold halves of a matched mold:
      (i) wherein the space between opposed surfaces of the mold halves varies in different areas of the mold;
      (ii) wherein certain areas of the mold, where the sheet is to be stretched, have been heated to a temperature in the range of from approximately 90° F. to approximately 140° F. and wherein other areas of the mold, where the sheet is to be stiffened, have been chilled to a temperature in the range of from approximately 30° F. to approximately 90° F.;
   (c) closing the mold;
   (d) allowing said sheet to remain in said mold for an approximate period of time of at least 3 seconds;
   (e) opening said mold and removing said molded article.

2. In a method of forming a finished molded article having various portions with varying thicknesses and densities from a sheet of foamed thermoplastic material, the steps of:
   (a) subjecting said sheet to a sufficient temperature range and for a period of time sufficient to expand said sheet until the general cross-sectional dimension is greater than the maximum dimension required in the finished product;
   (b) while the temperature of said sheet is still within said temperature range, inserting said sheet between cooperating male and female mold halves of a matched mold:
      (i) wherein the space between opposed surfaces of the mold halves varies in different areas of the mold;
      (ii) wherein certain areas of the mold, where the sheet is to be stretched, have been heated and wherein other areas of the mold, where the sheet is to be stiffened, have been chilled;
   (c) closing the mold;
   (d) allowing said sheet to remain in said mold for a period of time sufficient to cool the molded article and thereby prevent further expansion of the article after the mold has been opened;
   (e) opening said mold and removing said molded article.

References Cited

UNITED STATES PATENTS

| 2,522,956 | 9/1950 | Middleton | 264—327 XR |
| 2,749,572 | 6/1956 | Nowak | 264—327 XR |
| 3,137,747 | 6/1964 | Kline | 264—321 XR |
| 3,326,443 | 6/1967 | Burkett | 229—2.5 |

FOREIGN PATENTS 523,287   10/1953   Belgium.

PHILIP E. ANDERSON, Primary Examiner

U.S. Cl. X.R.

18—19; 229—2.5; 264—51, 237, 291, 321, 327